United States Patent
Taguelmimt et al.

(10) Patent No.: US 11,334,378 B2
(45) Date of Patent: May 17, 2022

(54) METHOD FOR PERFORMANCE ANALYSIS BY EXTRAPOLATION OF A SOFTWARE APPLICATION IN A CLUSTER OF SERVERS

(71) Applicant: BULL SAS, Les Clayes-sous-Bois (FR)

(72) Inventors: Noureddine Taguelmimt, Les Clayes-sous-Bois (FR); Stephan Jaure, Les Clayes-sous-Bois (FR)

(73) Assignee: BULL SAS, Les Clayes sous-Bois (FR)

( * ) Notice: Subject to any disclaimer, the term of this patent is extended or adjusted under 35 U.S.C. 154(b) by 264 days.

(21) Appl. No.: 16/722,514

(22) Filed: Dec. 20, 2019

(65) Prior Publication Data

US 2020/0348953 A1 Nov. 5, 2020

(30) Foreign Application Priority Data

Dec. 21, 2018 (FR) .................................... 1873784
Sep. 24, 2019 (FR) .................................... 1910554

(51) Int. Cl.
G06F 9/455 (2018.01)
G06F 17/17 (2006.01)

(52) U.S. Cl.
CPC .............. *G06F 9/455* (2013.01); *G06F 17/17* (2013.01)

(58) Field of Classification Search
CPC .... G06F 9/455; G06F 17/17; G06F 2201/865; G06F 11/3404; G06F 11/3409; G06F 11/3495
USPC ......................................................... 703/22
See application file for complete search history.

(56) References Cited

U.S. PATENT DOCUMENTS

| | | | |
|---|---|---|---|
| 8,755,411 B2* | 6/2014 | Chen ..................... | H04L 43/087 370/516 |
| 2011/0075577 A1* | 3/2011 | Chen ...................... | H04L 43/50 370/252 |
| 2020/0202872 A1* | 6/2020 | Jensen .................. | G10L 19/167 |

OTHER PUBLICATIONS

Search Report as issued in French Patent Application No. 1910554, dated Jan. 31, 2020.

(Continued)

*Primary Examiner* — Juan C Ochoa
(74) *Attorney, Agent, or Firm* — Arc IP Law, PC; Joseph J. Mayo

(57) ABSTRACT

A method for performance analysis of a software application, by its parallel execution in a cluster of reference servers, includes a first execution involving exchanges of useful data between computational and storage nodes of the cluster of servers executed by an interconnection network according to a predetermined protocol by encapsulating these useful data in messages of predetermined size; a second execution involving the same exchanges of useful data between the same computational and storage nodes of the cluster of servers executed by the same interconnection network according to the same protocol but with a different predetermined message size; an extrapolation of the software application performance comprising a simulation of a variation of a bandwidth of the interconnection network based on the difference in the predetermined size of the messages exchanged during the first and second executions.

10 Claims, 3 Drawing Sheets

(56) References Cited

OTHER PUBLICATIONS

Kerbyson, D. J., "A Look at Application Sensitivity to the Bandwidth and Latency of Infiniband Networks", Proceedings, 20th International Parallel and Distributed Processing Symposium, Apr. 2006, XP010920516, pp. 1-7.

Schulz, M., et al., "On the Performance of Transparent MPI Piggyback Messages," International Conference on Financial Cryptography and Data Security, Sep. 2008, XP019105791, 5 pages.

* cited by examiner

FIG. 2
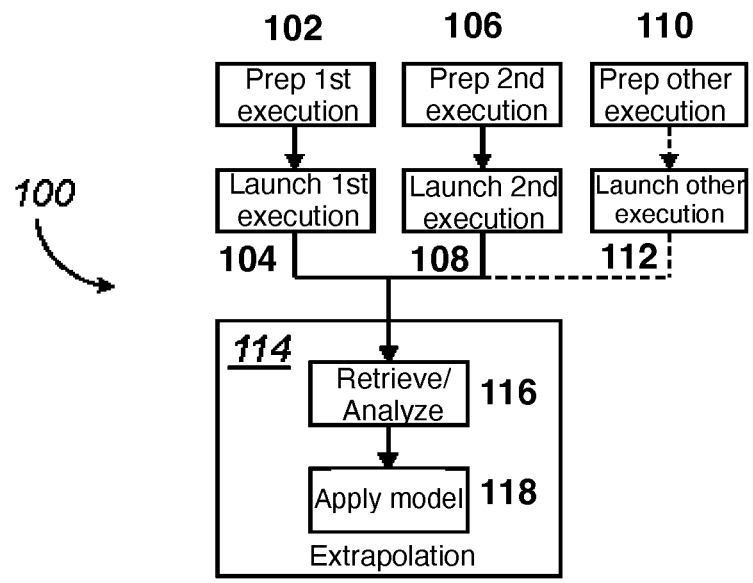
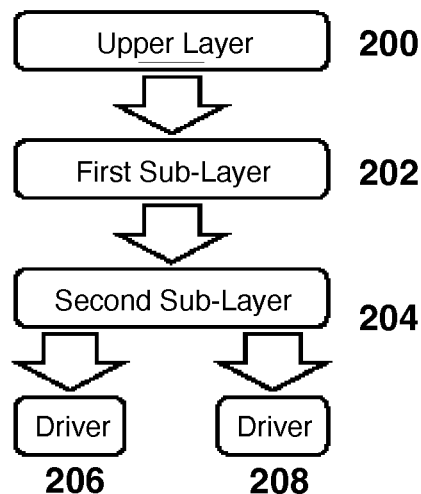
FIG. 3

FIG. 4
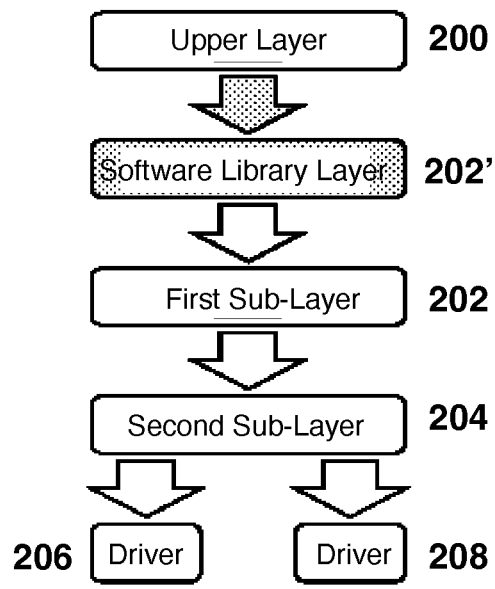
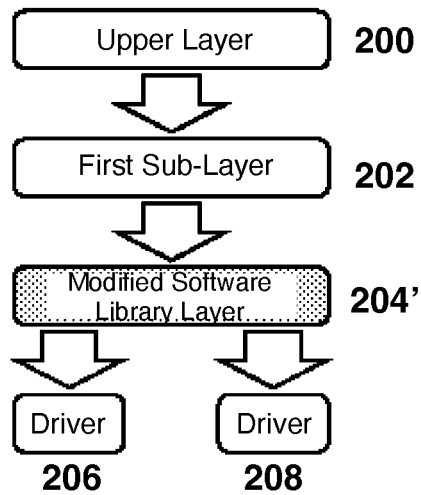
FIG. 5

METHOD FOR PERFORMANCE ANALYSIS BY EXTRAPOLATION OF A SOFTWARE APPLICATION IN A CLUSTER OF SERVERS

CROSS-REFERENCE TO RELATED APPLICATIONS

This application claims the benefit of French Patent Application No. 1873784, filed Dec. 21, 2018, and French Patent Application No. 1910554, filed Sep. 24, 2019, the disclosure of which is herein incorporated by reference in its entirety.

BACKGROUND OF THE INVENTION

Technical Field of the Invention

The present invention relates to an analysis method, by extrapolation, of performance of a software application by its execution in parallel on several computational nodes of a cluster of reference servers. It also relates to a computer program comprising instructions for the execution of said method.

In this context, it is a matter of predicting, by extrapolation, the performance of the software application on a target cluster of servers, i.e., a high performance computer or supercomputer (i.e., a computer from the HPC ("High Performing Computing") field, the architecture and dimensioning of which are defined by comparison ("benchmark") with the reference cluster of servers which may also be characterized as a benchmark super computer.

HPC, or high performance computing, continues to affect more scientific fields, such as the environment, meteorology, and physics. In these fields, the need to solve ever more complex problems, whether at the level of models or of their resolution, involves a high demand for computing capacity on server clusters.

These server clusters comprise the above-mentioned computational nodes, storage nodes and at least one network of interconnected computational nodes and storage nodes for the exchange of messages according to a predetermined message transmission protocol. This network is a high speed messages transmission network for the optimization of parallel computations. It is generally characterized as "Interconnect" or "InfiniBand", with these terms including different technologies.

Description of the Related Art

One of the key problems in the design of a cluster of servers is its dimensioning. In fact, in the context of a tender call, for example, the latter is generally accompanied by a set of scientific applications, giving rise to an analysis, test and performance projection campaign. The final objective of this campaign is to dimension the target cluster of servers and to define its architecture. This is done in two steps: a performance optimization step for scientific applications and an optimization step for the price of the proposed system.

One of the major problems of performance analyses of scientific software applications is the unavailability of the target cluster of servers, i.e., the one that will be proposed to the holder of the tender offer. This is explained essentially by two reasons. First, with the variety of architectures and computing systems, it is impossible to have all existing models available. Second, the target cluster of servers may simply be in current development and only be on the market months, even years, after the bid proposal date. The principal characteristics of this target cluster of servers can, nonetheless, be communicated by their builders upstream. One then has recourse to simulation by extrapolation of the reference target cluster of servers This simulation is generally conducted by dedicated teams who use more or less complex models based essentially on an analysis of the sensitivities of parallel execution of the software applications to be tested for the different possible characteristics of the target cluster of servers. These characteristics comprise the GHz frequency of the processors, the bandwidth of the live memory connected locally to these processors in Go/s and the bandwidth in Go/s of the interconnection network.

BRIEF SUMMARY OF THE INVENTION

In this field of analysis by extrapolation, there are several approaches, among which the main ones are:
varying the frequency of the benchmark supercomputer processors via system parameters, in order to analyze the sensitivity of the software application to the frequency of the processors that execute it,
studying the MPI ("Message Passing Interface") communication layer of the message passing protocol used during execution of the software application, in order to analyze the sensitivity of the application to the bandwidth of the interconnection network of the benchmark supercomputer.
varying the placement of the instruction threads of the software application during its execution by adjusting the number of computational nodes requested and the number of computational cores available per computational node, in order to analyze the sensitivity of the application to the bandwidth of the interconnection network of the benchmark supercomputer by thus simulating a variation of the bandwidth of the interconnection network available per process.

In this context, the invention applies more particularly to a method for the performance analysis of a software application by its execution in parallel on several computational nodes of a cluster of reference servers further comprising several storage nodes and at least one interconnection network of the computational and storage nodes together for the exchange of messages according to a predetermined message transmission protocol, with the method comprising:
a first execution of the software application by the cluster of servers involving exchanges of data useful for its execution between the computational and storage nodes of the cluster of servers executed by the interconnection network according to the predetermined protocol by encapsulating these useful data in the messages of a predetermined size;
a second execution of the software application by the cluster of servers, involving the same exchanges of useful data between the same computational and storage nodes of the cluster of servers executed by the same interconnection network according to the same predetermined protocol; and
an extrapolation of the performance of the software applications on the basis of at least one of the two executions.

The performance analysis by extrapolation of the software application thus comprises an assessment of its sensitivity to the variations of the frequency of the processors which is very simple to implement and, in general, poses no problems. The latter has the benefit of not causing significant, non-linear effects to the other sensitivity parameters, which is a very beneficial property of analysis by extrapolation.

The performance analysis by extrapolation of the software application advantageously further comprises an assessment of its sensitivity to variations of the interconnection network bandwidth. Only the last two solutions make this possible. But this is not done simply and without undesirable effects to the simulation. In particular, trace extrapolation approaches, such as, for example, those taught in the Carrington et al article entitled "Characterizing large-scale HPC applications through trace extrapolation", published in Parallel Processing Letters @World Scientific, volume 23, n° 4 (2013), are complex to implement and cause non-linearities by impacting other characteristics. The same is true of approaches proceeding by means of a study of the performance of the MPI communication layer by projection, such as, for example, those taught in the article by Sharkawi et al, entitled "SWAPP: a framework for performance projections of HPC applications using benchmarks", published in IEEE 26th International Parallel and Distributed Processing Symposium Workshops & PhD Forum (Proceedings of) in 2012. More generally, it is difficult to simulate variations in bandwidth without acting physically on the interconnection network, its switches or its access interfaces. These actions involve frequent shutdowns of the benchmark supercomputer and resulting intervention time.

Thus, it may be desirable to provide a method for performance analysis by extrapolation of a software application which makes it possible to rid oneself of at least some of the above-mentioned problems and constraints.

Therefore, a method is proposed for the performance analysis of a software application by its execution in parallel on several computational nodes of a cluster of reference servers further comprising several storage nodes and at least one interconnection network of the computational and storage nodes together for the exchange of messages according to a predetermined message transmission protocol, with the method comprising:
- a first execution of the software application by the cluster of servers involving exchanges of data useful for its execution between computational and storage nodes of the cluster of servers executed by the interconnection network according to the predetermined protocol by encapsulating these useful data in messages of a predetermined size;
- a second execution of the software application by the cluster of servers, involving the same exchanges of useful data between the same computational and storage nodes of the cluster of servers executed by the same interconnection network according to the same predetermined protocol;
- an extrapolation of the performance of the software applications on the basis of at least one of the two executions;

characterized in that:
- the predetermined size of the messages exchanged during the second execution differs from that of the messages exchanged during the first execution while the useful data exchanged are the same; and
- the extrapolation of performance of the software application comprises a simulation of variation of a bandwidth of the interconnection network based on the predetermined difference in size of the messages exchanged during the first and second executions.

Thus, by very simply adjusting the size of the exchanged messages using an MPI protocol, we cleverly simulated several possible bandwidths of the interconnection network without acting physically on the latter. The performance analysis by extrapolation of an HPC software application is facilitated, at least in this bandwidth aspect. It does not increase complexity, nor undesirable effects of non-linearity.

Optionally, the second execution of the software application by the cluster of servers is only distinguished from the first execution by the size of the messages exchanged according to the predetermined protocol.

Also optionally, the predetermined size of the messages exchanged during the second execution differs from that of the messages exchanged during the first education only by the addition or deletion of data in these messages, so-called padding data, useless for the execution of the application.

Also optionally, the simulation of variation in bandwidth of the interconnection network is executed by application of the following ratio:

$$B_2 = B_1 \cdot \frac{T_1}{T_2},$$

where $T_1$ is the predetermined size of the messages exchanged according to the protocol predetermined during the first execution of the software application, $T_2$ is the predetermined size of the messages exchanged according to the protocol predetermined during the second execution of the software application, $B_1$ is an apparent bandwidth of the interconnection network of the cluster of reference servers and $B_2$ is another apparent bandwidth of the same interconnection network resulting from the variation of the simulated bandwidth of the interconnection network.

Also optionally:
- during one of the first and the second executions of the software application, each message comprises N bytes of useful data transmitted from a transmitting computational node to a recipient computational node;
- during the other of the first and second executions of the software application, each message comprises N+N' bytes of data of which N bytes of useful data are transmitted from a transmitting computational node to a receiving computational node and N' bytes of additional padding data are transmitted according to a communication layer of the predetermined protocol for the sending of messages but not provided to the recipient computational node and not visible by the software application currently being executed.

Also optionally, the predetermined size of the messages is modified from one execution to the other of the software application by adaptation of a software component of the communication layer of the predetermined protocol for sending messages, this communication layer being intended to be called upon during each execution of the software application each time that a message must be sent in the interconnection network.

Also optionally, the predetermined size of the messages is modified from one execution to the other of the software application by the insertion of a call to a software library for the encapsulation of the message sending service dedicated to this modification in size each time that the execution of the software application involves a primitive call of request to send a message from the communication layer of the predetermined protocol for the sending of messages, the primitive call then being executed by the called encapsulation software library Also optionally, the predetermined size of the messages is modified from one execution to the next of the software application by the programming of this modification in at least one interfacing software library with at least one interconnection network driver, said interfacing software library being called by a request primitive for message sending of the predetermined protocol communication layer, itself called by the execution of the software application each time a message must be sent.

Also optionally, the predetermined protocol for the sending of messages is an MPI protocol.

A computer program is also proposed, which may be down loaded from a communication network and/or recorded on a medium that can be read by computer and/or can be executed by a processor, comprising instructions for the execution of the steps of a method for the performance analysis of a software application according to the invention, when said program is executed on a computer.

BRIEF DESCRIPTION OF THE DRAWINGS

The invention will be better understood using the specification below, given only by way of example, and given in reference to the annexed drawings in which:

FIG. 2 illustrates the successive steps of a method for analysis by extrapolation according to an embodiment of the invention.

FIG. 3 schematically represents a succession of programmed software layers for the implementation of exchanges of messages in the benchmark supercomputer of FIG. 1.

FIG. 4 schematically represents a possible adaptation of the succession of software layers from FIG. 3, for the execution of the method from FIG. 2, and FIG. 5 schematically represents another possible adaptation of the succession of software layers from FIG. 3 for the execution of the method from FIG. 2.

DETAILED DESCRIPTION OF THE INVENTION

Figure 1:
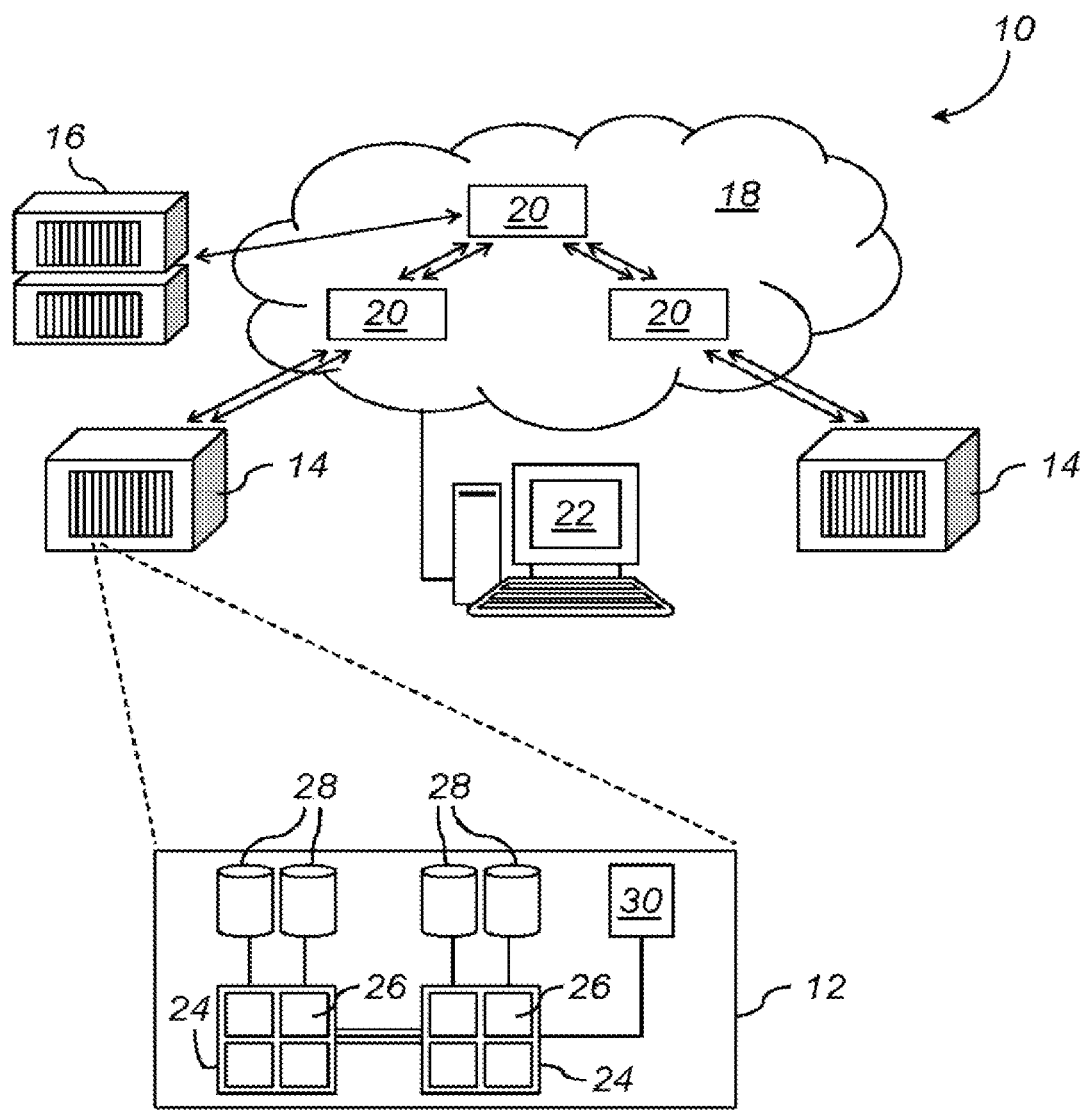
FIG. 1 schematically represents the general structure of a benchmark supercomputer on which a method for the analysis by extrapolation according to the invention can be implemented.

The reference cluster of servers 10, or benchmark supercomputer 10, represented schematically by FIG. 1, comprises multiple computational nodes 12, distributed in the computer bays 14, several storage nodes 16 and at least one interconnection network 18 of the computational and storage nodes between them, for the exchange of messages according to a predetermined protocol for the sending of messages, for example, an MPI protocol. The interconnection network 18 comprises, as is known per se, switches 20, organized to optimize the exchanges of data in this benchmark supercomputer 10. An administration console 22 is also part of the benchmark supercomputer 10 for the execution of general administration programs, specifically in order to make it possible to intervene within certain operational parameters, including that of the MPI protocol, as will be seen below.

A single computational node 12 is illustrated in FIG. 1, but they can all be designed according to the same architecture. It comprises several four computational core 26 multi-core processors 24 each as well as several local memories 28, in particular RAM memories. Additionally, it comprises an input/output interface 30 for messages intended to transmit in the interconnection network 18 according to the MPI protocol. This example of a computational node is given purely as an illustration, knowing that multiple architectures are possible.

Using the administration console 22, it is possible to deploy the parallel execution of any software application by the benchmark supercomputer 10 and to analyze its performance. Additionally, it is possible to provide several modifications to the benchmark supercomputer 10, by simulation or intervention on certain of these elements, for example, in terms of processor frequency and bandwidths between processors and associated random access memories or in the interconnection network 18, in order to simulate the operation of a target supercomputer using the benchmark supercomputer 10. The analysis by extrapolation is done using an extrapolation by example model stored in memory in the administration console 22. The latter is then capable of executing the successive steps of the method 100 for the analysis by extrapolation illustrated on FIG. 2 by executing a succession of computer program instructions.

During a step 102 of preparation of a first execution of the software application in question, the communication layer of the MPI protocol is configured from the administration console 22 so that all of the messages exchanged during the coming execution have a size $T_1$.

During a following step 104, the first execution of the software application is launched from the administration console 22. It involves exchanges of data useful for its execution, between the computational 12 and storage 16 nodes of the benchmark supercomputer 10. These exchanges are executed by the interconnection network 18 according to the MPI protocol, more specifically, according to its communication layer, by encapsulating these useful data in size $T_1$ messages. The performance of the software application obtained by this first execution is measured against certain predetermined parameters.

During a step 106 of preparation of a second execution of the software application in question, the communication layer of the MPI protocol is configured from the administration console 22 so that all of the messages exchanged during the coming execution have a size $T_2$, different from $T_1$ while the useful data to be exchanged and encapsulated in these messages are the same.

During a following step 108, the second execution of the software application is launched from the administration console 22. It involves the same exchanges of data useful for its execution, between the computational 12 and storage 16 nodes of the benchmark supercomputer 10. These exchanges are executed the same way by the interconnection network 18 according to the MPI protocol, more specifically, according to its communication layer, by encapsulating these useful data in size $T_2$ messages. The performance of the software application obtained by this second execution is measured against certain predetermined parameters. Advantageously, the second execution of the software application by the benchmark supercomputer 10 is only distinguished from the first execution by the size of the messages exchanged according to the communication layer of the MPI protocol. More specifically, the size $T_2$ of the messages exchanged during the second execution differs from that ($T_1$) of the messages exchanged during the first execution only by the addition or deletion of padding data in these messages. These padding data are useless for the execution of the software application and are only used to vary the size of the messages from $T_1$ to $T_2$ or from $T_2$ to $T_1$. If applicable, they are included in the messages at encapsulation according to the communication layer of the MPI protocol and are extracted from the messages at de-encapsulation according to the same communication layer, such that they are completely invisible from the software application itself and from its parallel execution by the different computational nodes 12. These operations are completed in the input/output interfaces of the various components of the benchmark supercomputer 10, particularly in the interfaces 30 of the computational nodes.

If we choose to use the first execution of the software application as a reference by considering $T_1$ as the nominal size of the messages without padding data, then size $T_2$ of the messages exchanged during the second execution can only differ from that ($T_1$) of the messages exchanged during the first execution by the addition of padding data in order to simulate a reduction of bandwidth between the first and second executions. As a variant, we could choose to use the second execution of the software application as a reference by considering $T_2$ as the nominal size of the messages without padding data. In this case, the size $T_1$ of the messages exchanged during the first execution would differ from that ($T_2$) of the messages exchanged during the second execution only by the addition of padding data in order to simulate a reduction of bandwidth between the first and second executions. Also as a variant, both executions could be done with different quantities of padding data, obviously without alteration of the useful data, in order to simulate different, sub-optimal band widths.

Thus, everything happens as if, all other things being equal, the bandwidth of the interconnection network 18 had varied between the first and second executions of the software application. If we designate as $B_1$ the apparent bandwidth of the interconnection network 18 during the first execution of the software application and as $B_2$ the apparent bandwidth during the second execution, the following relationship between $B_1$ et $B_2$ can be established:

$$B_2 = B_1 \cdot \frac{T_1}{T_2}. \qquad \text{[Math. 1]}$$

Optionally, and possibly repeatedly, during at least one step 110 of preparation of at least one other execution of the software application in question, at least one other parameter of the benchmark supercomputer 10 is modified from the administration console 22 or by physical intervention: for example, the clock frequency of the processors, the local bandwidth for access to random access memories associated with the processors, etc.

During a step 112, executed after each optional step 110, another execution of the software application is launched from the administration console 22. It involves exchanges of data useful for its execution, between the computational 12 and storage 16 nodes of the benchmark supercomputer 10. The performance of the software application obtained by each additional execution is measured against predetermined parameters.

Steps 104, 108 and possibly 112 are followed by an analysis by extrapolation phase 114 of the performance that the software application in question could present on the target supercomputer as intended by the parameter modifications executed during steps 102, 104 and possibly 110.

During a first step 116 of this phase 114, the results of steps 104, 108 and possibly 112 are retrieved and analyzed. In particular, the calculation of bandwidths $B_1$ and $B_2$ can be executed at this step.

During a following step 118, the stored in memory extrapolation model is applied. An example model will now be presented. It is based on a macroscopic view of the different behaviors of the software application and of their dependence on the characteristics of the target supercomputer in question: principally, the characteristics of the processors (number of cores, set of instructions, frequency, bandwidth for access to the local memory) and of the interconnection network (latency and band width), but also on the performance of the storage nodes and of the file system.

Thus, it can be considered that, for any analyzed software application, the execution time for the different tasks can be broken down into three parts:
  communication time, including the part of the execution time governed by the application of the MPI protocol and the use of the input/output interface components.
  CPU time, including the part of the execution time governed by the clock frequency of the processors, and memory time, including the part of the execution time governed by the performance in main memory.

The result is, for example, the following three-part extrapolation model:

$$\frac{T(f, BW, IB)}{T_{ref}} = \alpha_{MPI+IO}\left(\eta_{coll} + (1 - \eta_{coll})\frac{IB_{ref}}{IB}\right) + \qquad \text{[Math. 2]}$$

$$\alpha_{CPU} \cdot \frac{f_{ref}}{f}\left(1 - \kappa\left(1 - \frac{Nop_{ref}}{Nop}\right)\right) + \alpha_{BW} \cdot \frac{BW_{ref}}{BW(f)}.$$

In this model, $T(f,BW,IB)$ is the execution time extrapolated on the target supercomputer and Tref is the execution time on the benchmark supercomputer 10, with its own parameters. Additionally, f is the clock frequency of the processors of the target supercomputer, $f_{ref}$ is the clock frequency of the processors of the benchmark supercomputer, BW is the memory access bandwidth for the local memory of each computational core of the target supercomputer, $BW_{ref}$ is the access bandwidth to the local memory of each computational core of the reference supercomputer, IB is the bandwidth of the interconnection network of the target supercomputer, $IB_{ref}$ is the bandwidth of the interconnection network of the reference supercomputer, Nop is the number of flops per cycle.

Finally, the terms in Greek letters $\alpha_{MPI+IO}$, $\alpha_{CPU}$, $\alpha_{BW}$, $\eta_{coll}$ and K are coefficients which characterize the execution of the software application in a specific configuration. Their determination is empirical and within the scope of the person skilled in the art.

For example, $\alpha_{MPI+IO}$ is a coefficient that can be determined by measurement that is relative to the dependent part of the code of the MPI communications. This information is provided by a single execution of the software application equipped with a profiling software library that intercepts and performs time measurements of the relevant API ("Application Programming Interface") calls.

Also for example, $\alpha_{CPU}$ is a coefficient that can be determined by measurement that is relative to the part of the code depending on the CPU clock frequency. Its calculation can be done by executing the software application under several clock frequencies of the computational nodes.

Also for example, $\alpha_{BW}$ is a coefficient that can be determined by measurement which is relative to the part of code depending on the bandwidth of CPU accesses to the local memory. Its calculation can be solved by running the software application under several simulated BW bandwidths, particularly by varying the number of computational cores activated in each processor of each computational node according to different possible modes: for example, a "compact" mode according to which all of the processes allocated to a processor are linked to a single connector of this processor, or a "scatter" mode according to which the processes allocated to a processor are distributed between the two connectors of this processor (in this case, the bandwidth is doubled).

Also for example, $\eta_{coll}$ is a coefficient that can be determined by measurement which is relative to the collective communications operations ratio in relation to all of the communications operations. This is a ratio calculated by taking the execution time of the collective operations divided by the total time of collective communications operations and point-to-point operations. By "collective operations" is meant operations involving all of the parallel processes of a group of processes, such as reduction operations (i.e., the fact of providing a unique value at output using a plurality of input values, like the calculation of a maximum, for example), of broadcast, for sending a process value to an entire group of other processes) or a combination of these types of operations. By "point-to-point operations" is meant, in contrast, operations involving only two processes, the one being a transmitter, the other a receiver. In order to simplify the calculation of this ratio, a hypothesis can be used that the execution time of the collective operations is independent of the bandwidth of the communication system, which is verified for most of the cases considering the very small size of collective operations messages. This coefficient can be measured using application profiles that make it possible to determine the execution time for each type of communication operation, collective or point-to-point.

Also for example, K is a coefficient that can be determined by measurement that is relative to the sensitivity of the execution time at vectorization. It is generally determined by using different versions of a same application, compiled with different levels of instruction sets and by observing the effect of each instruction set on the performance of the application.

By executing, for example, the software application in the normal, non-simulated, configuration of the benchmark supercomputer 10 at step 104, i.e., by exchanging, according to the MPI protocol only data useful for this execution without adding padding data, we can replace $IB_{ref}$ by $B_1$ and IB by $B_2$ in the extrapolation model. The result is that the extrapolation of performance of the software application comprises a simulation of variation of a bandwidth of the interconnection network 18 based on the predetermined difference in size of the messages exchanged during the two executions 104 and 108.

More generally, during one of the first and second executions 104 and 108 of the software application, each message comprises N bytes of useful data transmitted from a transmitting computational node to a receiving computational node, while during the other of the first and second executions of the software application, each message comprises N+N' bytes of data including N bytes of useful data transmitted from a transmitting computational node to a receiving computational node and N' bytes of additional padding data added in the communication layer of the MPI protocol but not provided to the receiving computational node and not visible by the software application currently being executed. All of this occurs as if the speed of the interconnection network had varied by a factor of N/(N+N').

FIGS. 3, 4 and 5 show how concretely the MPI protocol can simulate the bandwidth variation of the interconnection network 18 seamlessly for the execution of the software application in question.

FIG. 3 shows the successive software layers customarily called upon during data exchanges according to the MPI protocol.

The upper layer 200 is that in which the software application in question is executed. For each transmission or reception of data useful at its execution it calls upon the communication layer of the MPI protocol. This communication layer comprises a first "Front End" sub-layer 202 and a second sub-layer 204 of MPI manufacture or "Back End" layer. The first sub-layer 202 comprises request primitives for sending messages intended to be called upon by the software application during its execution. The second sub-layer 204 comprises at least one interfacing software library with at least one driver of the interconnection network 18. The lower layer of the MPI protocol is that of the drivers, two of these being shown in FIG. 3 under references 206 and 208.

Thus, as shown in gray on FIGS. 4 and 5, the size of the messages exchanged by execution of the software application in question is advantageously modified from one execution to the next by adaptation of a software component of the communication layer 202, 204 of the MPI protocol. This has the advantage of completing this modification in a totally seamless manner for the software application.

More specifically, according to a first possible embodiment shown in FIG. 4, a layer 202' comprising a software library of encapsulation of message transmitting service, dedicated to the modification of the size of messages each time that the execution of the software application involves calling on a primitive of layer 202, is inserted between layer 200 and layer 202. In this way, primitive calls launched from layer 200 are intercepted and interpreted by layer 202' as calls to the encapsulation software library, which can be qualified as "wrapper MPI", each primitive call of layer 202 being then executed by the called encapsulation software library.

However, it must be noted that this implementation risks necessitating copies in the intermediate buffer memories, which could produce false results. However, it is possible to correct this by measuring the specific time elapsed in these copies.

In order to avoid this, according to a second possible embodiment shown in FIG. 5, the predetermined size of the messages is modified from one execution to the next of the software application by programming this modification in the interfacing software library/libraries of layer 204 which is then modified in 204'. This modification then occurs when an interfacing software library of layer 204' is called upon by a request primitive for message sending from layer 202 itself called upon by the execution of the software application of layer 200 each time that a message must be sent.

It is clear that a method for the analysis by extrapolation such as the one previously described cleverly makes it possible to simulate, simply and without undesirable effects of non-linearity, several interconnection network bandwidths without acting physically on the network, which can then be reported in an extrapolation model. It goes without saying that the beneficial technical effects of this invention are independent of the choice of extrapolation model from the moment when the latter exploits data resulting from a variation, simulated or physically imposed, of the bandwidth of the interconnection network. Reciprocally, the extrapolation model described above has benefits and beneficial effects independently from the main object of this invention.

We will further note that the invention is not limited to the embodiments described above. In fact, it will be clear to the person skilled in the art that various modifications can be made to the embodiments described above, in light of the teaching that was just disclosed to him. In the detailed description of the invention provided above, the terms used must not be interpreted as limiting the invention to the embodiments set out in this description, but must be interpreted to include in them all of the equivalents that can be foreseen by the person skilled in the art by applying his general knowledge to the implementation of the teaching that has just been disclosed to him.

What is claimed is:

1. A method for performance analysis of a software application by its execution in parallel on several computational nodes of a cluster of reference servers further comprising several storage nodes and at least one interconnection network of the several computational nodes and the several storage nodes together for an exchange of messages according to a predetermined message transmission protocol the method comprising:
   a first execution of the software application by the cluster of reference servers involving exchanges of useful data for its execution between the several computational nodes and the several storage nodes of the cluster of reference servers executed by the at least one interconnection network according to the predetermined message transmission protocol by encapsulating the useful data in messages of a predetermined size;
   a second execution of the software application by the cluster of reference servers, involving a same exchanges of useful data between the several computational nodes and the several storage nodes of the cluster of reference servers executed by the at least one interconnection network according to the same predetermined message transmission protocol;
   an extrapolation of a performance of the software application based on at least one of the first execution and the second execution:
   wherein:
   the predetermined size of the messages exchanged during the second execution differs from that of the messages exchanged during the first execution while the useful data exchanged are same; and
   the extrapolation of the performance of the software application comprises a simulation of variation of a bandwidth of the at least one interconnection network based on a predetermined difference in size of the messages exchanged during the first execution and the second execution.

2. The method for performance analysis of a software application according to claim 1, wherein the second execution of the software application by the cluster of reference servers is only distinguished from the first execution by the size of the messages exchanged according to the predetermined message transmission protocol.

3. The method for performance analysis of a software application according to claim 1, wherein the predetermined size of the messages exchanged during the second execution differs from that of the messages exchanged during the first execution only by an addition or deletion of data in said messages, said data comprising padding data, useless for execution of the software application.

4. The method for performance analysis of a software application according to claim 1, wherein the simulation of bandwidth variation of the at least one interconnection network is executed by application of a relation comprising:

$$B_2 = B_1 \cdot \frac{T_1}{T_2},$$

where T1 is the predetermined size of the messages exchanged according to the predetermined message transmission protocol predetermined during the first execution of the software application, T2 is the predetermined size of the messages exchanged according to the predetermined message transmission protocol predetermined during the second execution of the software application, B1 is an apparent bandwidth of the at least one interconnection network of the cluster of reference servers and B2 is another apparent bandwidth from the at least one interconnection network resulting from the variation of simulated bandwidth of the at least one interconnection network.

5. The method for performance analysis of a software application according to claim 1, wherein:
   during one of the first execution and the second execution of the software application, each message comprises N bytes of useful data transmitted from a transmitting computational node to a recipient computational node;
   during another of the first execution and the second execution of the software application, each message comprises N+N' bytes of data of which N bytes of useful data are transmitted from a transmitting computational node to a receiving computational node and N' bytes of additional padding data are transmitted according to a communication layer of the predetermined message transmission protocol for sending the messages but not provided to the recipient computational node and not visible by the software application currently being executed.

6. The method for performance analysis of a software application according to claim 5, wherein the predetermined size of the messages is modified from one execution to a next execution of the software application by adaptation of a software component of the communication layer of the predetermined message transmission protocol for the sending of the messages, said communication layer being intended to be called upon during each execution of the software application each time that a message must be sent in the at least one interconnection network.

7. The method for performance analysis of a software application according to claim 6, wherein the predetermined size of the messages is modified from one execution to the next execution of the software application by insertion of a call to a software library for encapsulation of a message sending service dedicated to modification of size each time that execution of the software application involves a primitive request call to the predetermined message transmission protocol to send a message from the communication layer of the predetermined message transmission protocol for the sending of the messages, the primitive request call then being realized by the software library for encapsulation called upon.

8. The method for performance analysis of a software application according to claim 7, wherein the predetermined size of the messages is modified from one execution to the next execution of the software application by the programming of said modification in at least one interfacing software library with at least one interconnection network driver, said at least one interfacing software library being called by one primitive request for message sending of the communication layer of the predetermined message transmission protocol for the sending of messages, itself called by execution of the software application each time a message must be sent.

9. The method for performance analysis of a software application according to claim 1, wherein the predetermined message transmission protocol for sending messages is an MPI protocol.

10. A non-transitory computer readable medium that includes a computer program that is readable by one or more of a computer and executable by a processor, comprising instructions for execution of a method for performance analysis of a software application by its execution in parallel on several computational nodes of a cluster of reference servers further comprising several storage nodes and at least one interconnection network of the several computational nodes and the several storage nodes together for an exchange of messages according to a predetermined message transmission protocol, when said computer program is executed on a computer, wherein said method comprises:

a first execution of the software application by the cluster of reference servers involving exchanges of useful data for its execution between the several computational nodes and the several storage nodes of the cluster of reference servers executed by the at least one interconnection network according to the predetermined message transmission protocol by encapsulating the useful data in messages of a predetermined size;

a second execution of the software application by the cluster of reference servers, involving a same exchanges of useful data between the several computational nodes and the several storage nodes of the cluster of reference servers executed by the at least one interconnection network according to the predetermined message transmission protocol;

an extrapolation of a performance of the software application based on at least one of the first execution and the second execution;

wherein:

the predetermined size of the messages exchanged during the second execution differs from that of the messages exchanged during the first execution while the useful data exchanged are same; and the extrapolation of the performance of the software application comprises a simulation of variation of bandwidth of the at least one interconnection network based on a predetermined difference in size of the messages exchanged during the first execution and the second execution.

* * * * *